(No Model.)

J. S. TIBBALS.
JOINT FOR EARTHENWARE PIPES.

No. 285,179. Patented Sept. 18, 1883.

Witnesses
Geo. H. Strong
J. H. Krouse

Inventor
John S. Tibbals
By Dewey & Co.
Attorneys

UNITED STATES PATENT OFFICE.

JOHN S. TIBBALS, OF SAN FRANCISCO, CALIFORNIA.

JOINT FOR EARTHENWARE PIPES.

SPECIFICATION forming part of Letters Patent No. 285,179, dated September 18, 1883.

Application filed February 10, 1883. (No model.)

*To all whom it may concern:*

Be it known that I, JOHN S. TIBBALS, of the city and county of San Francisco, State of California, have invented an Improved Joint for Earthenware Pipes; and I hereby declare the following to be a full, clear, and exact description thereof.

My invention relates to a new and useful joint for earthen and stone ware pipe, or for any pipe which is designed to be put together by flanges and intervening cement.

My invention consists in flanges or shoulders molded, cast, or secured upon each section of pipe near each end, and in a cap or covering bolted over the joint and fitting behind the shoulders. Cement intervenes, and is molded tightly to its place by the cap, as will hereinafter fully appear, reference being made to the accompanying drawings, in which—

Figure 1:
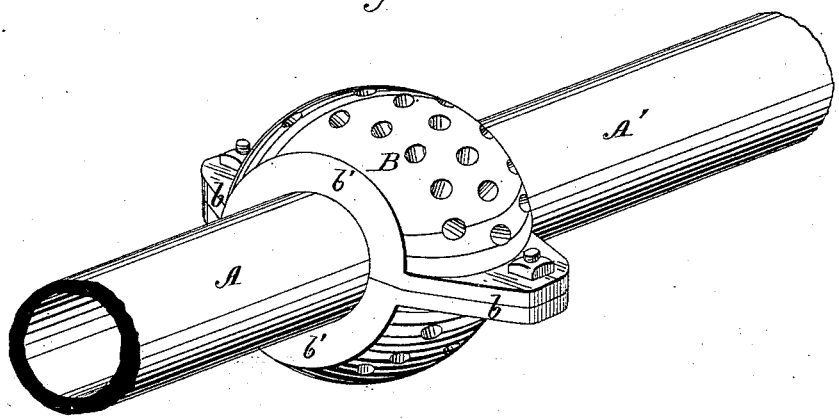
Figure 2:
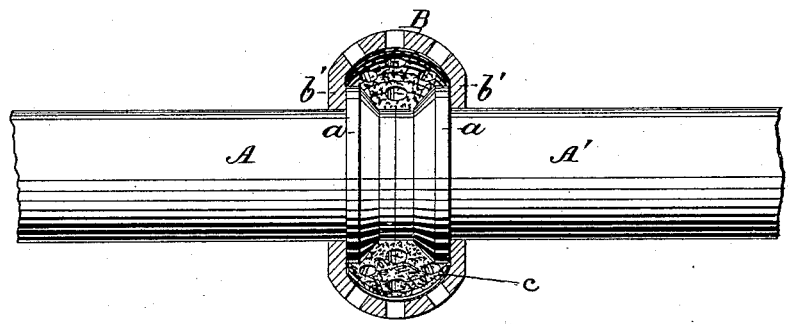
Figure 3:
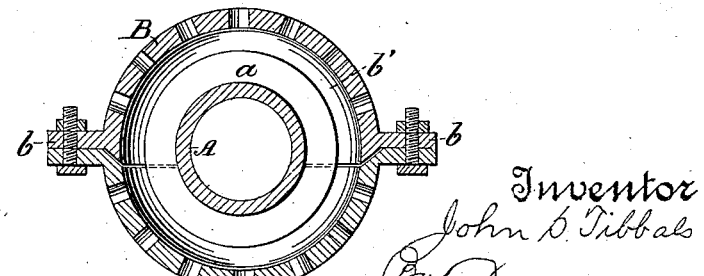

Figure 1 is a perspective view, showing the outer cap or cover. Fig. 2 is a longitudinal vertical section of my joint, showing the cement around the coupling. Fig. 3 is a transverse section through the joint.

Earthenware pipes and others of like character are generally made in sections of varying length, each having a straight end and a flaring end, the latter of which is known as the "flange." In laying such pipe the straight end of one is inserted in the flange of the one adjoining, and the two are held together by cement filled in between, so as to form a tight joint; but this joint is imperfect, as far as holding the pipes together is concerned, for with a sudden force in the direction of their length, the joint, having no other security than the adhesion of the cement, is apt to be loosened.

It is the object of my invention to provide a joint adapted to resist such force, and at the same time to be perfectly water-tight.

Let A represent a section of pipe, and A' another. These are made with straight ends, and are adapted to abut, as shown in Fig. 2. Near the end of each pipe are flanges or shoulders $a$. These may be cast or molded upon the pipe; or they may be made separate, of any suitable material, and secured thereon.

B is a cap, made in halves, (here shown as semicircular,) and designed to encircle the pipes A A' at their joint. The cap is provided with ears $b$, by which the two parts are bolted, as shown in Figs. 1 and 3. The cap is curved in longitudinal section, as shown in Fig. 2, and has end flanges, $b'$, which fit down behind the flanges or shoulders $a$, Fig. 2. It will thus be seen that when the cap is bolted to its place the two pipes are held securely and will be prevented from parting. In order to make the joint tight, I fill the space within the cap with cement $c$. This is done readily by placing the cement around the joint before the cap is applied. The cap is perforated, as shown, and when placed upon the pipes and bolted down securely, it presses the cement closely around the joint, the surplus material being squeezed out through the perforations in the cap. This has the effect of molding the cement $c$ around the joint, which for this reason is rendered tight, and because of the cap itself it is likewise rendered strong and secure.

Having thus described my invention, what I claim as new, and desire to secure by Letters Patent, is—

1. The abutting pipes A A', having the flanges or shoulders $a$ near their ends, in combination with the encircling-cap B, having end flanges, $b'$, fitting behind the shoulders $a$, said cap being made in halves and provided with ears $b$, whereby it is bolted firmly to its place, substantially as herein described.

2. The abutting pipes A A', having the flanges or shoulders $a$ near their ends, in combination with the perforated cap B, fitting over the joint and shoulders $a$, and a body of cement, $c$, filling the space around the joint within the cap, substantially as herein described.

In witness whereof I hereunto set my hand.

JOHN S. TIBBALS.

Witnesses:
S. H. NOURSE,
WM. F. BOOTH.